Oct. 5, 1926.
J. E. CARROLL
1,601,939
AUTOMOBILE SPRING SUSPENSION
Filed June 13, 1924  4 Sheets-Sheet 1
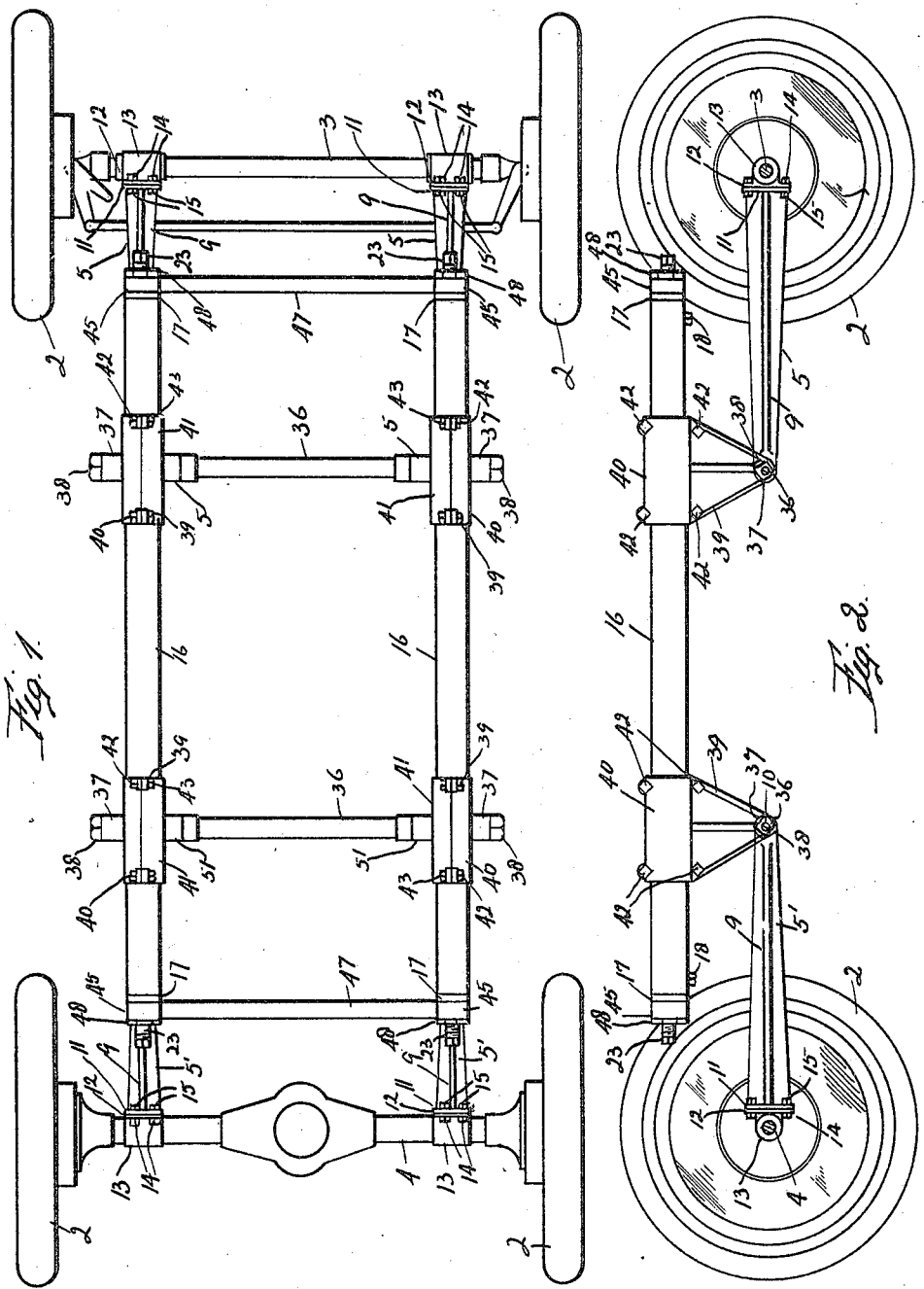
INVENTOR
John E. Carroll
By W. W. Williamson Atty.

Oct. 5, 1926.
J. E. CARROLL
1,601,939
AUTOMOBILE SPRING SUSPENSION
Filed June 13, 1924     4 Sheets-Sheet 2
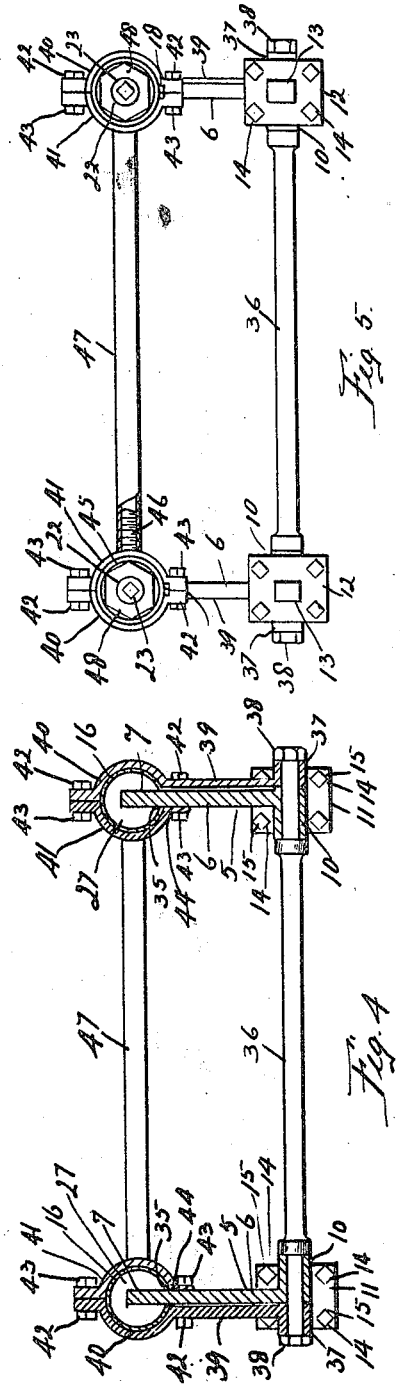
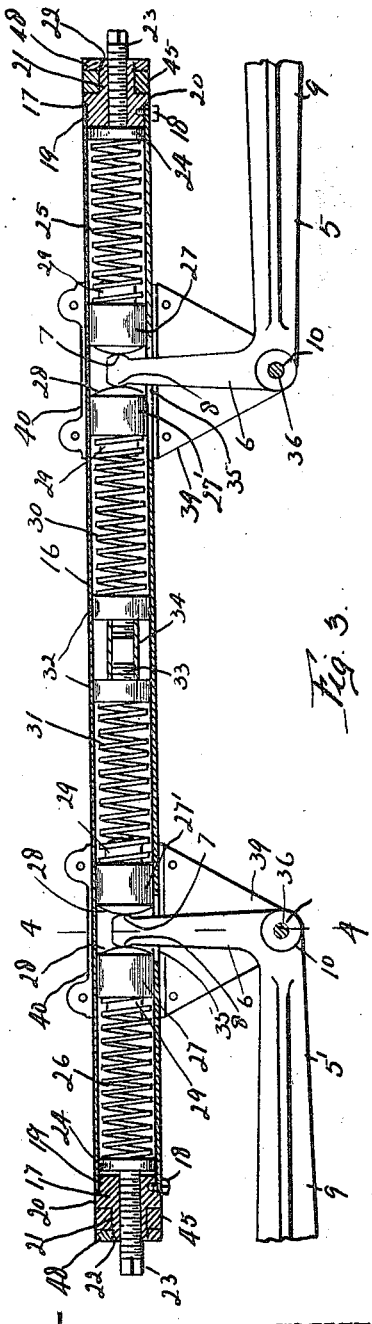
INVENTOR
John E. Carroll
By W. W. Williamson Atty.

Oct. 5, 1926.
J. E. CARROLL
1,601,939
AUTOMOBILE SPRING SUSPENSION
Filed June 13, 1924  4 Sheets-Sheet 5
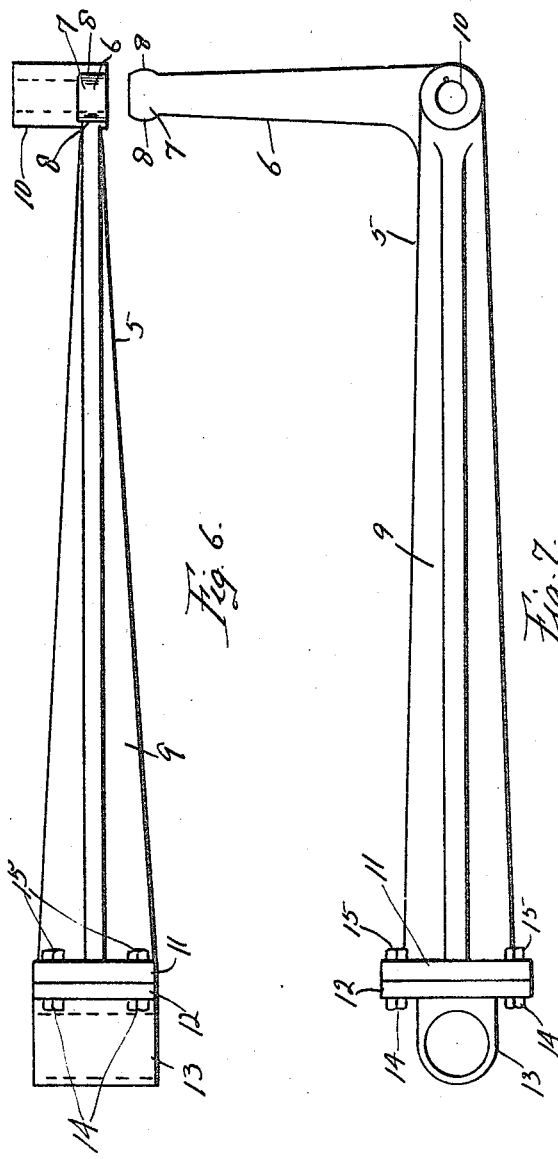
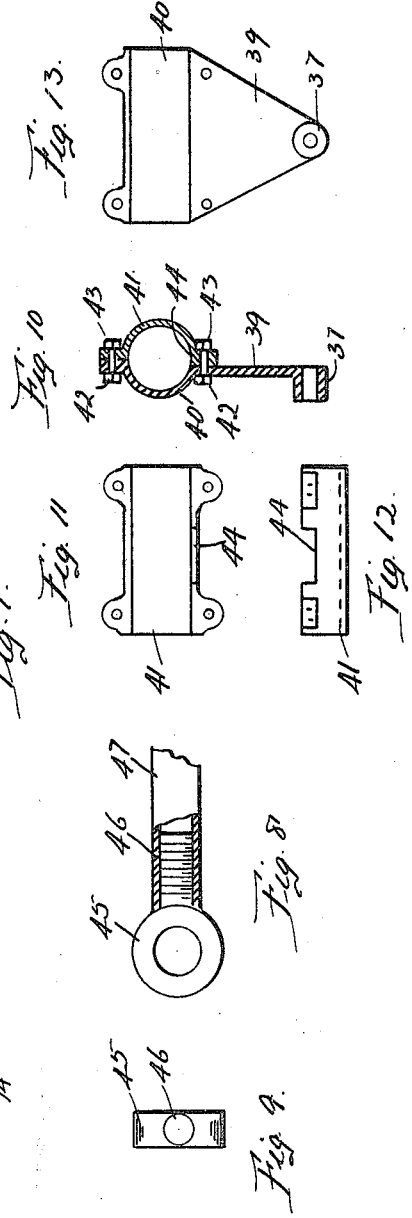
INVENTOR
John E. Carroll

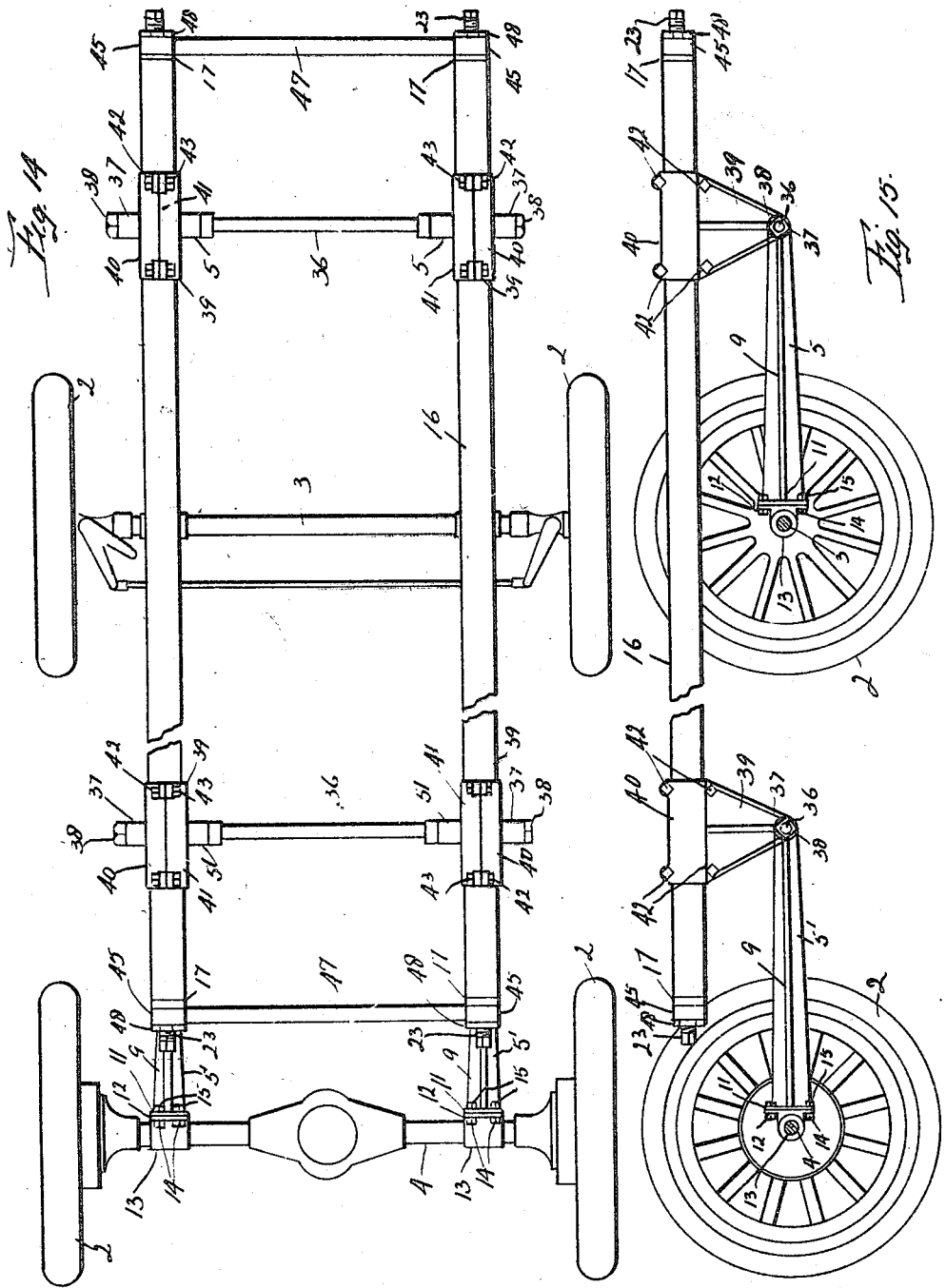

Patented Oct. 5, 1926.

1,601,939

UNITED STATES PATENT OFFICE.

JOHN E. CARROLL, OF SAGINAW, MICHIGAN.

AUTOMOBILE SPRING SUSPENSION.

Application filed June 13, 1924. Serial No. 719,713.

My invention relates to new and useful improvements in an automobile spring suspension, and has for its primary object the location of suitable springs in the side members of a vehicle chassis which act on suitable levers connected with the front and rear running gears in order that shocks incident to travel of the wheels over a road bed will be absorbed by the springs.

Another object of the invention is to construct the side members of an automobile chassis from tubular sections and to house a plurality of coiled springs in said tubular side members and in endwise alignment so as to be compressible when acted upon by levers connected with the running gear.

Another object of the invention is to provide intervening means between the several springs in order that the action of the levers on a spring will be transmitted to other springs and likewise the reaction will be absorbed by a number of springs.

A further object of this invention is to provide means for tying together the frame side members which structure comprises frame end trunnions mounted in the ends of the frame side members with swivel yokes journalled on the trunnions and connected with the tie rods thereby giving enormous flexibility to the frame.

A still further object of the invention is to provide a number of levers fixed to the axles of a vehicle each lever having a horizontal arm approximately three times the length of its vertical arm, the end of the shorter arm freely working between opposed shoes slidably mounted within the tubular side members of the frame, said shoes being normally forced in opposite directions by opposed spiral springs.

With these in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 1, is a plan view of an automobile chassis illustrating my improvement applied thereto.

Fig. 2, is a side elevation thereof with the near side wheels removed and portions of the axles broken away.

Fig. 3, is an enlarged longitudinal sectional side elevation of one of the frame side members, looking at it from the inside of the chassis, and illustrating the connection between the internal elements and the levers.

Fig. 4, is a section at the line 4—4 of Fig. 3.

Fig. 5, is an end view thereof.

Fig. 6, is an enlarged plan view of one of the levers.

Fig. 7, is a side elevation of Fig. 6.

Fig. 8, is a fragmentary sectional side elevation of one of the tie rods and an associated swivel yoke.

Fig. 9, is an end view of the swivel yoke.

Fig. 10, is a vertical sectional view of one of the cross shaft brackets.

Fig. 11, is an inner face view of the clamping member of such bracket.

Fig. 12, is a bottom edge view thereof.

Fig. 13, is an inner face view of the body portion of the bracket.

Fig. 14, is a plan view of a vehicle chassis illustrating a slightly modified arrangement of the parts.

Fig. 15, is a side elevation thereof with the near side wheels removed and portions of the axles broken away.

In carrying out my invention as here embodied, 2 represents the usual wheels of a vehicle, such as an automobile, suitably journalled on front and rear axles 3 and 4 respectively. It is to be understood that wherever axles are mentioned this term is to include the axles proper or their component parts including the "dead" front axle and the housings.

To the front and rear axles are fixed suitable levers 5 and 5' respectively and as shown in Figs. 1 and 2 these levers project toward each other, or in other words, the levers on the front axle project rearwardly and those on the rear axle project forwardly. Each lever comprises a short vertical arm 6 having an enlargement 7 at its upper free end to provide arcuate bearing surfaces 8 and a long horizontal arm 9 which is approximately three times the length of the short arm and at the inner end of this long arm, or the juncture point of the two arms is a fulcrum bearing 10, while at the other or outer end of the longer arm is a flange 11 whereby the lever may be bolted to the flange 12 of the axle bracket 13 which latter is fixed in any suitable manner, as by riveting, to its respective axle. The means for fastening a lever to an axle bracket as here shown comprises bolts 14 and nuts 15 but it will be understood that any equivalent fastening means may be substituted.

The reference numeral 16 represents the frame side members, of which there are generally two, running lengthwise of the vehicle in parallel relation. These frame side members are of tubular formation, Fig. 4, and in both ends of each side member is mounted a frame end trunnion 17 held in place by set screws 18 passing through the walls of the side members and threaded into the frame end trunnions. Each frame end trunnion comprises a body portion 19 adapted to snugly fit inside of the side member, a flange 20 to overlie the end or edge of the side member, a reduced wrist portion 21 and a further reduced threaded extension 22. Each frame end trunnion also has a threaded bore for the reception of an adjusting screw 23.

As above stated these frame end trunnions are mounted in both ends of a frame side member and the inner ends of the adjusting screws 23 impinge against plate washers or discs 24, the latter engaging the outer ends of the endmost coiled springs 25 and 26. The spring 25 is the one at the front of the vehicle while the spring 26 is the one at the rear. The opposite, or inner ends of the springs 25 and 26 engage spring shoes 27 slidably mounted within the tubular side members and each of these shoes has an arcuate bearing face or surface 28 for coaction with the arcuate bearing surfaces 8 of the levers and these shoes may have lugs 29 formed thereon of less diameter than said shoes so as to fit within the springs.

Opposed to the shoes 27 and located adjacent thereto are other shoes 27' of duplicate construction and also slidably mounted in the tubular side members for engagement with the short arms of the levers on the sides opposite the shoes 27. These shoes 27' coact with the outer ends of the springs 30 and 31 while the inner ends of the last named springs engage the compensating blocks or plungers 32 which are slidably mounted in the tubular frame side members in spaced relation to each other, since they are arranged in pairs, and connected by means of their threaded projections 33 with a reach member 34 preferably in the form of a tube. This reach member may be of any desirable length in order to span the distance between the compensating blocks 32.

At the points where the spring shoes 27, 27' meet or approach each other are formed slots 35 in each frame side member through which project the free ends of the short arms of the levers for interposition between adjacent coacting spring shoes, said slots being of sufficient length to permit the necessary movements of the levers.

The levers 5 are journalled upon cross shafts 36 the ends of which are mounted in suitable bearings 37 and held in place by nuts 38 threaded on the projecting ends of the shafts. The bearings 37 form parts of the hangers or side member brackets 39, one of said brackets being located in the region of each slot 35 or in the locality of the normal positions of the spring shoes 27, 27' and therefore they are directly opposite each other on opposite frame side members, as plainly shown in Fig. 1. Each of these brackets or hangers includes an integral semi-cylindrical body 40 to partially surround a frame side member and a semi-cylindrical clamp or clamping member 41 adapted to partially surround the side member opposite the body 40 and be secured to the latter by means of bolts 42 and nuts 43 or their equivalent. The clamping member 41 has a notch 44 formed in its lower edge for the passage of the short arm of a lever and this notch is adapted to register with a slot 35 in the frame side member.

In order to tie the frame together while permitting full flexibility thereto, I mount swivel yokes 45 on the wrist portions 21 of the several frame end trunnions and these swivel yokes include threaded stems 46 for threaded engagement with the tie rods 47 arranged transversely of the vehicle frame and these tie rods are preferably of tubular construction. The swivel yokes are held in place on the frame end trunnions by nuts 48 screwed on the reduced threaded extensions 22 of the frame end trunnions.

From the foregoing description it will be noted that as a wheel, for example a front wheel, strikes an obstruction on the road bed over which the vehicle is traveling said wheel will be thrust upward causing the levers 5 to operate so that the free end of the short arm of the lever moves rearwardly and compresses the spring 30 but instead of absorbing the entire shock on the one spring, the shock is passed on through said spring and the compensating blocks with their connected reach member to the spring 31, thence through the spring shoes operating in conjunction with the levers 5' to the spring 26 and therefore the three mentioned springs will be absorbing the shock incident to the wheel striking an obstruction.

To more fully illustrate the above point let us assume that the spring 30 moves forward three inches due to the shock on the wheel which as soon as distributed among the several springs will produce a compression of one inch on each spring. Now let us assume that the shock that caused a three inch compression of the spring 30 was nine hundred pounds, that would indicate that when each of the three springs mentioned has been compressed one inch the nine hundred pounds had been absorbed, which would be three hundred pounds to each spring and since the pressure of nine hundred pounds is first applied to one spring will be obvious that the spring 30 has an advantage of approximately three to one in regaining its normal attitude or position.

During the compression of the springs 30, 31 and 26, the spring 25 will expand in following up the movements of the parts so as to absorb the shock incident to the recoil action.

The operation of the parts when a shock is transmitted to the rear wheels is similar to that above described with the exception that the springs which absorb said shock will be those numbered 31, 30 and 25 while the spring 26 will take up the recoil.

Another action that affords advantages to the absorption of the shock is, that the shock is absorbed in the direction of travel of the vehicle. This advantage can only be calculated by assuming that the vehicle is traveling exactly as fast as the springs are compressed and under such conditions there would be no apparent shock to the frame of the vehicle.

Another point to be particularly noted is that the longer arms of the levers are three times the length of the shorter arms and therefore the shock will be absorbed by the springs three times as fast as it can be transmitted to the vehicle body.

In Figs. 14 and 15, I have illustrated a slight modification of my invention wherein the levers connected with the front axle project forwardly or in the same direction as the levers connected with the rear axle. The arrangement of the springs and other elements is identical to the construction illustrated in connection with Figs. 1 and 2, but of course the frame side members must be extended beyond the front axle. In this form of the invention a shock to a front wheel will be absorbed by the single spring 25 and the recoil will be taken care of by the other three springs. This construction is very good for use on vehicles where the major portion of the load is carried well to the rear of the vehicle or over the rear axle. The operation of the parts due to a shock on the rear wheels is the same as that hereinbefore described.

Of course I do not wish to be limited to the exact details of construction as herein shown as these may be varied within the limits of the appended claims without departing from the spirit of my invention.

Having thus fully described my invention, what I claim as new and useful is:—

1. An automobile spring suspension comprising a frame, springs housed in said frame, axles and L-shaped levers fulcrumed on portions of the frame with one end of each lever fixed to an axle and the other end of each lever lying between adjacent springs.

2. A vehicle spring suspension including a tubular side member of the frame, an axle, an L-shaped lever fulcrumed below the side member a distance from the axle and having one end fixed to said axle with the opposite end projecting into the tubular frame member, and springs within the tubular frame member on opposite sides of the end of the lever projecting into the frame member.

3. The structure set forth in claim 2 in connection with shoes interposed between the lever end and the springs.

4. An automobile spring suspension comprising a frame including parallel tubular side members, a pair of axles, hangers connected with the side members, L-shaped levers fulcrumed on said hangers with one end of each fixed to an axle and the other end of each projecting into a side member, a plurality of springs located in each side member so that their action is always in the direction of travel of the automobile, said springs being so located that one of them is on each side of the end of the lever projecting into a side member for coaction therewith, and means interposed between the two innermost springs in a side member whereby motion may be transmitted from one to the other.

5. The construction set forth in claim 4 in connection with shoes slidably mounted in the side members and interposed between the ends of the springs and the associated lever ends.

6. A spring suspension for vehicles including axles, tubular frame side members, means for flexibly tying said side members together, hangers carried by the side members, L-shaped levers having horizontal and vertical arms fulcrumed on the hangers, the horizontal arms being approximately three times the length of the vertical arms, said horizontal arms being fixed at their inner ends to the axles while the vertical arms project into the tubular side members, and means within said side members and on both sides of the vertical arms to produce spring action on the latter.

7. A spring suspension for vehicles including axles, tubular frame side members, means for flexibly tying said side members together, hangers carried by the side members, L-shaped levers having horizontal and vertical arms fulcrumed on the hangers, the horizontal arms being approximately three times the length of the vertical arms, said horizontal arms being fixed at their inner ends to the axles while the vertical arms project into the tubular side members, shoes slidably mounted in the side members on opposite sides of the vertical lever arms and coacting therewith, coil springs within the side members on both sides of each vertical lever arm and coacting with the shoes, and means interposed between the springs associated with different lever arms whereby motion may be transmitted from one movable part to all the others.

8. A spring suspension comprising axles, a frame including tubular side members, hangers carried by the side members, cross shafts mounted in the hangers, a pair of levers each including a vertical arm and a horizontal arm, said levers being fixed at the ends of their horizontal arms to the axles in pairs and projecting inwardly, said levers further being journalled on the cross shafts and having their vertical arms projecting into the side members of the frame, and springs within the side members and arranged for coaction with opposite sides of each vertical lever arm, the action of said springs being in the direction of travel of the vehicle.

9. The structure set forth in claim 8 in connection with frame end trunnions mounted in the ends of the side members, screws threaded through said trunnions, plates, washers interposed between the inner ends of said screws and the outer ends of certain of the springs, shoes slidably mounted in the side members and interposed between the vertical lever arms and adjacent ends of the springs, compensating blocks slidably mounted in the side members and coacting with the inner ends of the innermost springs, reach members connected with said compensating blocks, swivel yokes journalled on portions of the frame end trunnions, tie rods running transversely of the frame and having threaded connection with the swivel yokes and nuts having threaded connection with other portions of the frame end trunnions for retaining the swivel yokes in place.

10. A spring suspension comprising axles, a frame including tubular side members, hangers carried by the side members, cross shafts mounted in the hangers, a pair of levers each including a vertical arm and a horizontal arm, said levers being fixed at the ends of their horizontal arms to the axles in pairs and projecting forwardly, said levers further being journalled on the cross shafts and having their vertical arms projecting into the side members of the frame, and springs within the side members and arranged for coaction with opposite sides of each vertical lever arm, the action of said springs being in the direction of travel of the vehicle.

In testimony whereof, I have hereunto affixed my signature.

JOHN E. CARROLL.